United States Patent [19]

Suzuki

[11] Patent Number: 4,573,784
[45] Date of Patent: Mar. 4, 1986

[54] FOCUS DETECTING APPARATUS

[75] Inventor: Kenji Suzuki, Kawasaki, Japan

[73] Assignee: Canon Kabushiki Kaisha, Tokyo, Japan

[21] Appl. No.: 739,496

[22] Filed: May 30, 1985

Related U.S. Application Data

[63] Continuation of Ser. No. 558,005, Dec. 5, 1983, abandoned.

[30] Foreign Application Priority Data

Dec. 11, 1982 [JP] Japan .................................. 57-217467
Dec. 11, 1982 [JP] Japan .................................. 57-217469

[51] Int. Cl.⁴ ............................................. G03B 3/00
[52] U.S. Cl. ..................................... 354/406; 354/408
[58] Field of Search ............... 354/400, 402, 406, 407, 354/408

[56] References Cited

U.S. PATENT DOCUMENTS 4,185,191 1/1980 Stauffer .
4,249,073 2/1981 Stauffer et al. ..................... 354/402
4,250,376 2/1981 Joseph .
4,333,007 6/1983 Langlais .
4,368,383 1/1983 Shirasu et al. ...................... 354/402
4,373,791 2/1983 Araki .................................. 354/407
4,387,975 6/1983 Araki .
4,445,761 5/1984 Ishikawa et al. .................... 354/402

Primary Examiner—Russell E. Adams
Attorney, Agent, or Firm—Fitzpatrick, Cella, Harper & Scinto

[57] ABSTRACT

This specification discloses a focus detecting apparatus having an optical system for forming a plurality of object images on the basis of object lights passed through different pupil areas of an objective lens, and a sensor for putting out a plurality of data signals for the respective object images, wherein the amount of relative deviation of the object images is detected by a predetermined operation based on the data signal to thereby discriminate the focus state of the objective lens and wherein in the data signals put out from the sensor, the number of the data signals used for an operation is varied in accordance with the focus state or other condition of the objective lens.

10 Claims, 20 Drawing Figures

FOCUS DETECTING APPARATUS

This application is a continuation of application Ser. No. 558,005, filed Dec. 5, 1983 now abandoned.

BACKGROUND OF THE INVENTION

1. Field of the Invention

This invention relates to a focus detecting apparatus for use in optical instruments such as cameras.

2. Description of the Prior Art

In optical instruments such as cameras, focus detecting apparatuses are well known in which the amount of relative deviation of a plurality of object images formed on the basis of lights passed through different pupil areas of an objective lens is detected by a sensor to thereby detect the focus state of the objective lens.

For example, an apparatus in which a fly-eye-lens is disposed in the predetermined imaging plane (a plane equivalent to the film surface) of the photo-taking lens of a camera and a sensor array is disposed rearwardly of the fly-eye-lens, whereby the amount of deviation of images corresponding to the focus state of the photo-taking lens is detected is disclosed in U.S. Pat. No. 4,185,191 (issued Jan. 22, 1980). Also, so-called secondary imaging type apparatuses in which a plurality of imaging lenses are juxtaposed rearwardly of the predetermined imaging plane of the photo-taking lens, whereby a plurality of object images are directed to a sensor array to thereby detect the amount of deviation of the images are disclosed in Japanese Laid-open Patent Application No. 118019/1980 (laid open on Sept. 10, 1980) and Japanese Laid-open Patent Application No. 155331/1980 (laid open on Dec. 3, 1980). The apparatus of this type has a more or less greater full length than the aforementioned apparatus, but it has a merit in that it does not require any special optical system such as a fly-eye-lens.

The principle of the secondary imaging type focus detecting apparatus will hereinafter be described briefly by reference to FIG. 1 of the accompanying drawings. A field lens 2 having the same optic axis as that of a photo-taking lens 1 whose focus is to be adjusted is disposed in the predetermined imaging plane of the photo-taking lens 1 and two secondary imaging lenses 3a and 3b are parallel-disposed rearwardly of the field lens 2, and light-receiving sensor arrays 4a and 4b each comprising a plurality of photoelectric conversion elements are further disposed rearwardly of the secondary imaging lenses. Reference characters 5a and 5b designate stops provided near the secondary imaging lenses 3a and 3b. The field lens 2 substantially images the exit pupil of the photo-taking lens 1 on the pupil planes of the two secondary imaging lenses 3a and 3b. As a result, light fluxes entering the secondary imaging lenses 3a and 3b emerge from the region of equal area on the exit pupil of the photo-taking lens 1 which correspond to the secondary imaging lenses 3a and 3b and which do not overlap each other. When the primary image O' of an object O formed near the field lens 2 by the photo-taking lens 1 is re-imaged as secondary images O'' on the light-receiving surfaces of the sensor arrays 4a and 4b by the secondary imaging lenses 3a and 3b, the re-imaged two secondary images O'' vary their positions on the basis of the difference between the positions in the direction of the optic axis at which the primary image O' is formed.

FIGS. 2A, 2B and 2C of the accompanying drawings illustrate the manner in which such phenomenon occurs. The two secondary images O'' formed on the light-receiving surfaces of the sensor arrays 4a and 4b in the near-focus state and the far-focus state as shown in FIGS. 2B and 2C with the in-focus state of FIG. 2A as the center move in the opposite direction on the light-receiving surfaces of the sensor arrays 4a and 4b. If the then distributions of quantity of light of the secondary images O'' are photoelectrically converted into electrical signals by the sensor arrays 4a and 4b and these signals are processed by an operating circuit to thereby detect the amount of relative positioned deviation of the two secondary images O'', it will become possible to discriminate the focus state of the photo-taking lens 1.

As a method of processing the photoelectrically converted signals, there is known, for example, U.S. Pat. No. 4,250,376 (issued Feb. 10, 1981). According to this method, when the ith ones of data signals obtained by photoelectrically converting two secondary images O'' by sensor arrays 4a and 4b each comprising N photoelectric conversion elements are a(i) and b(i) ($i=1-N$) and the amount of deviation of each image O'' is V, $$V = \sum_{i=1}^{N-k} |a(i) - b(i+k)| - \sum_{i=1}^{N-k} |a(i+k) - b(i)| \quad (1)$$

is calculated for a suitable constant k by an analog processing circuit or a digital processing circuit and the direction of movement of the photo-taking lens 1 for focusing is determined by the positive or the negative of the value of this amount of deviation V.

Also, in U.S. application Ser. No. 464,578 (filed Feb. 7, 1983), applicant has proposed a processing method in which $$V = \sum_{i=1}^{N-k} \min\{a(i), b(i+k)\} - \sum_{i=1}^{N-k} \min\{a(i+k), b(i)\} \quad (2)$$

or $$V = \sum_{i=1}^{N-k} \max\{a(i), b(i+k)\} - \sum_{i=1}^{N-k} \max\{a(i+k), b(i)\} \quad (3)$$

is calculated and the direction of movement of the photo-taking lens 1 is determined by the positive or the negative of the amount of deviation V. In these equations, min{x, y} represents the smaller one of two real numbers x and y, max{x, y} represents the greater one of two real numbers x and y, and k is a suitable constant which usually is 1.

However, in the operation process based on these equations (1)-(3), the defocused state of the photo-taking lens 1 is merely discriminated. So, in such a focus detecting apparatus, methods in which, with attention paid to the fact that the amount of deviation of two secondary images O'' and the amount of defocus of the photo-taking lens 1 are in a proportional relation, an operation process comprising displacing one of the images relative to the other image is adopted to thereby detect the amount of defocus of the photo-taking lens 1 (the amount of movement of the photo-taking lens 1 to its in-focus position) are proposed, for example, by U.S. Pat. No. 4,333,007 (issued June 1, 1982) and U.S. Pat. No. 4,387,975 (issued June 14, 1983). For example, in U.S. Pat. No. 4,333,007, to find the amount of defocus of the photo-taking lens 1 from the amount of deviation of two images directed to the respective light-receiving surfaces of sensor arrays 4a and 4b, use is made of the data signals a(i) and b(i) from the sensor arrays 4a and 4b and an amount of displacement m(m is an integer value which satisfies $m_1 < m \leq m_2$) for moving the image indicated by b(i) relative to the image indicated by a(i) in the operation process is set up and the amount of deviation V(m) for the amount of displacement m which is $$V(m) = \sum_i |a(i) - b(i + 1 - m)| - \sum_i |a(i + 1) - b(i - m)| \quad (4)$$

is repetitively operated. The graph in which the value of the amount of deviation V(m) for the amount of displacement m is plotted is as shown in FIG. 3 of the accompanying drawings. Now, when the two images have become coincident with each other due to such relative movement of the images, the amount of deviation V(m) of equation (4) should be O and therefore, in the case of FIG. 3, there is present an amount of defocus of the order of 1.5 bits.

Also, even when equations (2) and (3) are used, the amount of defocus can be found by a similar process. For example, for the amount of displacement m, $$V(m) = \sum_i \min\{a(i), b(i + k - m)\} - \sum_i \min\{a(i + k), b(i - m)\} \quad (5)$$

may be repetitively operated to thereby find the zero-cross-point of the amount of deviation V(m).

Now, the operation for finding such an amount of defocus of the photo-taking lens 1 will require a remarkably long process time if the number of data signals a(i) and b(i), i.e., the number N of photoelectric conversion elements constituting each sensor array 4a, 4b, is great. For example, in equation (4), to find the amount of deviation V(m) for an amount of displacement m, there will be required 4N additions and subtractions, namely, 2N operations for finding the difference between the signs of the absolute values and 2N operations of the sum for finding the integrated value. On the other hand, the lower limit value $m_1$ and the upper limit value $m_2$ for determining the range of the amount of displacement m are generally $m_1 = (-N/2)$ and $m_2 = (N/2)$ and therefore, the number of the amounts of deviation V(m) to be calculated is of the order of N. Accordingly, where the amounts of deviation V(m) are to be calculated for the respective amounts of displacement m, there will be required about $4N^2$ operations. Actually, where such operations are to be carried out by a microcomputer provided within a camera, calculation steps such as updating of the memory address, discrimination of the operation area, etc. will also be necessary for each operation.

Therefore, if, in such an apparatus, the number of the elements of the sensor arrays 4a and 4b is increased to increase the number N of data signals a(i) and b(i) in order to improve the accuracy of the focus detecting function, the process time will become remarkably long to make it difficult to effect the focus detecting operation in real time because the entire amount of operation increases in proportion to $N^2$. Accordingly, the conventional apparatus of such type has suffered from an inconvenience that either the accuracy of the focus detecting function or the speed of the focus detecting operation becomes insufficient.

SUMMARY OF THE INVENTION

The present invention has been made in view of the above-noted situation and an object thereof is to provide a focus detecting apparatus which is improved in both the accuracy of the focus detecting function and the speed of the focus detecting operation.

Other objects of the present invention will become apparent from the following detailed description of some embodiments thereof taken in conjunction with the accompanying drawings.

DESCRIPTION OF THE PREFERRED EMBODIMENTS

Figure 1:
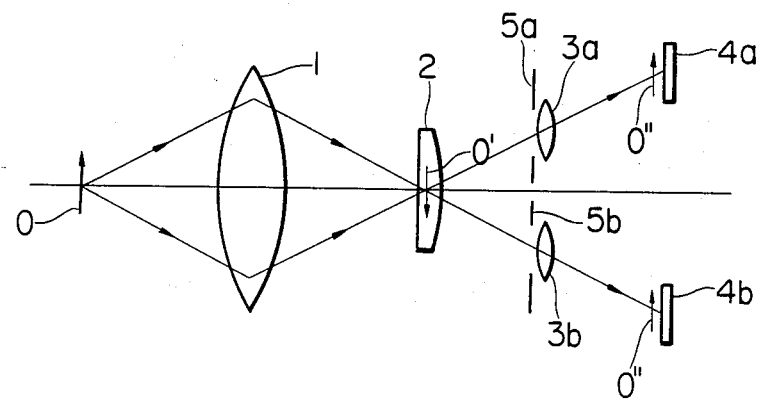
FIG. 1 is a plan view showing an example of the secondary imaging type focus detecting apparatus.
Figure 2A:
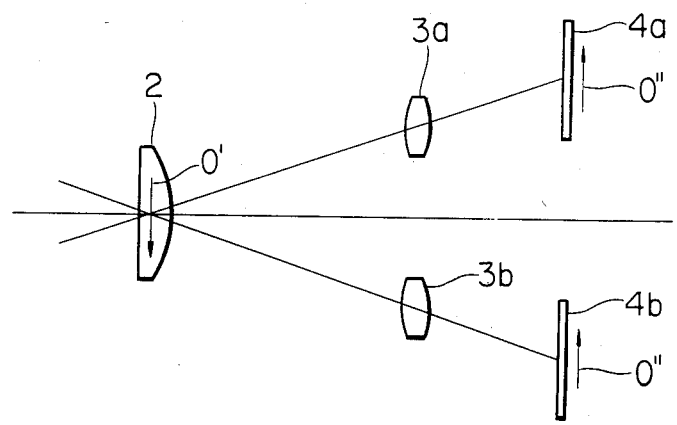
FIGS. 2A, 2B and 2C are plan views for illustrating the principle of focus detection in the apparatus of FIG. 1.
Figure 2B:
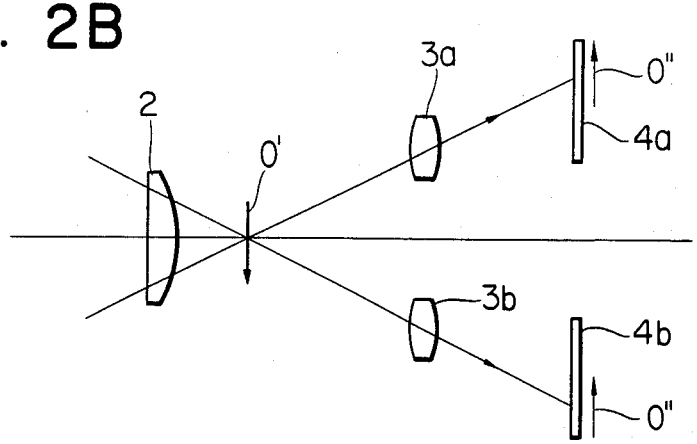
Figure 2C:
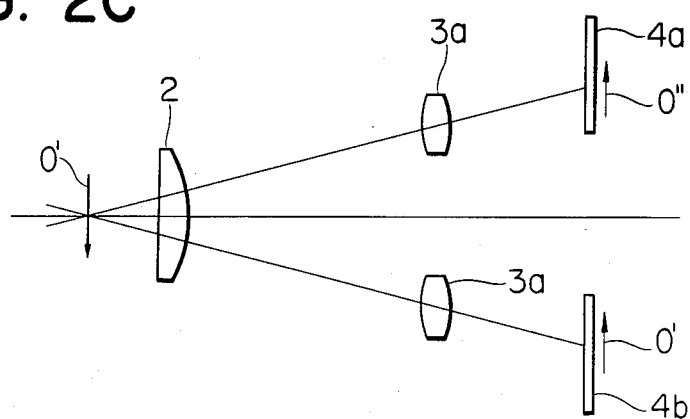
Figure 3:
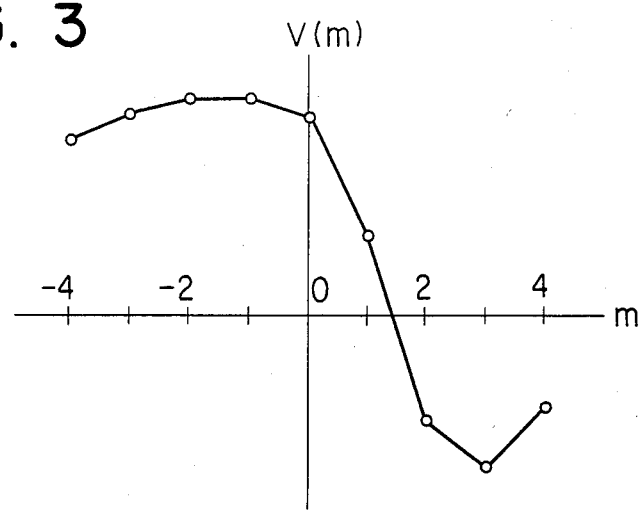
FIG. 3 is a graph showing an example of the operation output in the apparatus of FIG. 1.
Figure 4:
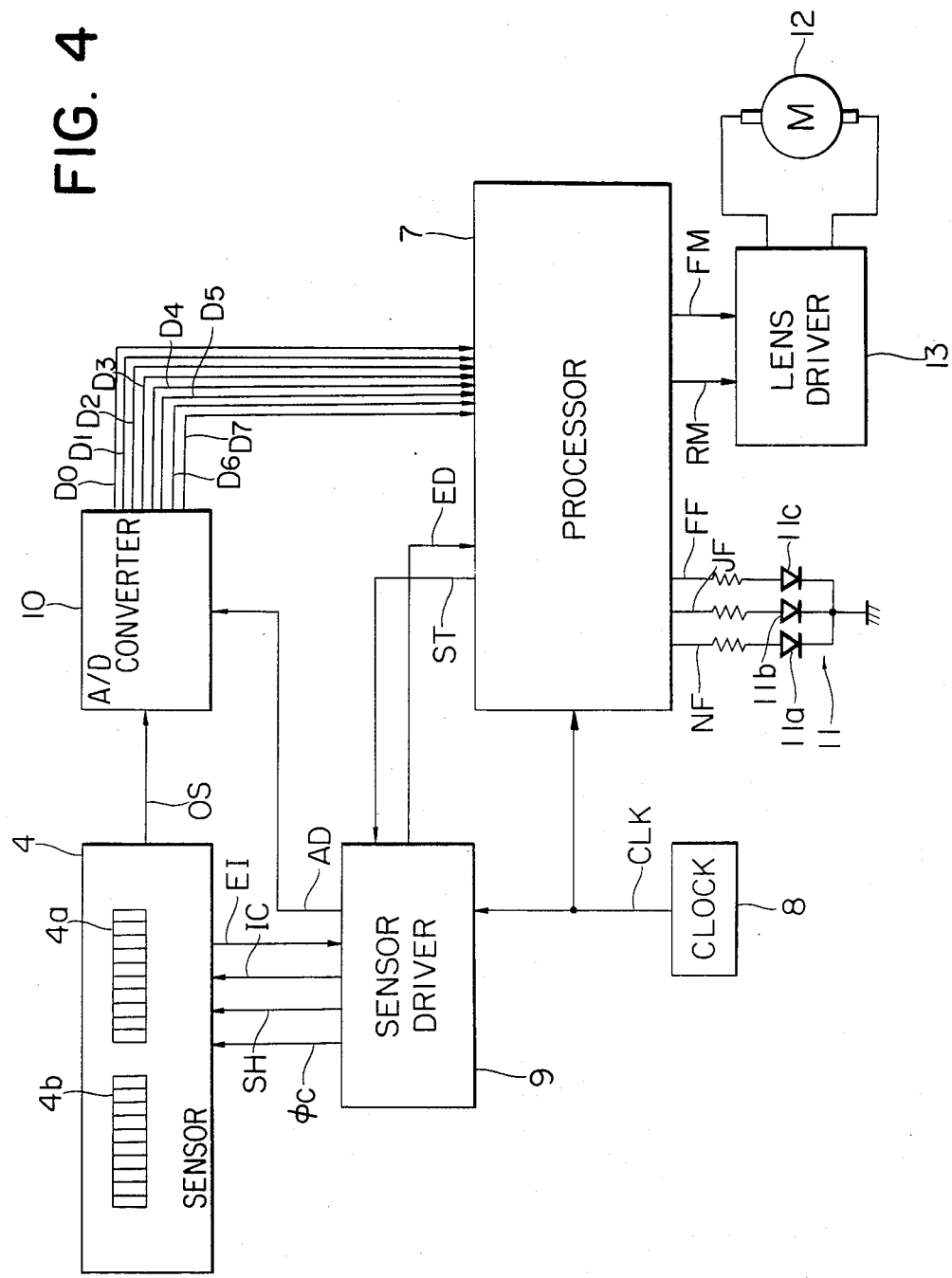
FIG. 4 is a circuit diagram showing an embodiment of the signal processing circuit in the focus detecting apparatus of the present invention.

Referring to FIG. 4, reference numeral 4 designates a sensor comprised of a CCD (charge coupled device). The sensor 4 has sensor arrays 4a and 4b for detecting two secondary images O'' formed by the secondary imaging lenses 3a and 3b of FIG. 1. The sensor arrays 4a and 4b each have N photoelectric conversion elements as previously mentioned, and when the data signals put out by the ith photoelectric conversion elements from the right end in the respective sensor arrays 4a and 4b are a(i) and b(i), the respective sensor arrays 4a and 4b form data signals a(1), a(2), . . . , a(N) and b(1), b(2), . . . , b(N) in accordance with the distributions of quantity of light of the secondary images O'' detected. Reference numeral 7 designates a data signal processing circuit which may be, for example, a 1-chip-microcomputer having a CPU (central processing unit), a RAM (random access memory), an I/O port, etc. Reference numeral 8 denotes a clock signal generating circuit which generates a clock-pulse CLK at a predetermined period from the time when supply of power has been started, reference numeral 9 designates a sensor-drive circuit for controlling the accumulation and transfer of the photoelectric conversion output in the sensor 4, reference numeral 10 denotes an A/D converter circuit for converting analog data signals transferred time-sequantially from the sensor 4 in the order of a(1), a(2), . . . , a(N), b(1), b(2), . . . , b(N) into 8-bit digital signals $D_0$–$D_7$, and reference numeral 11 designates a display device for displaying the focus state of the photo-taking lens 1. The display device 11 has a light-emitting diode 11a adapted to be turned on and display the near-focus state when the processor 7 detects the near-focus state of the photo-taking lnes 1 and renders the output of terminal NF into a high level, a light-emitting diode 11b adapted to be turned on and display the in-focus state when the processor 7 detects the in-focus state of the photo-taking lens 1 and renders the output of terminal JF into a high level, and a light-emitting diode 11c adapted to be turned on and display the far-focus state when the processor 7 detects the far-focus state of the photo-taking lens 1 and renders the output of terminal FF into a high level. Reference numeral 12 designates a motor for moving the photo-taking lens 1 in the direction of the optic axis to thereby effect focusing operation. The motor 12 is adapted to effect the focusing operations corresponding to the outputs of the terminals RM and FM of the processor 7 through a lens driving circuit 13. For example, the lens driving circuit 13 is adapted to short-circuit both terminals of the motor 12 to apply a brake thereto when both of the outputs of the terminals RM and FM are at high level, to revolve the motor 12 in a forward direction when the output of the terminal RM is at high level and the output of the terminal FM is at low level, to revolve the motor 12 in the reverse direction when the output of the terminal RM is at low level and the output of the terminal FM is at high level, and to electrically liberate the motor 12 when both of the outputs of the terminals RM and FM are at low level.

Operation will hereinafter be described by taking as an example a case where this embodiment is applied to a camera in which a main switch is closed upon depression of a shutter button to its first stroke and photographing operation such as shutter release is started upon depression of the shutter button to its second stroke.

When the main switch, not shown, is closed upon depression of the release button (not shown) to its first stroke, supply of power from a power source, not shown, to the circuit of FIG. 4 is started and the clock signal generating circuit 8 puts out a clock pulse CLK to the processor 7 and the sensor-drive circuit 9. Also, at this time, the processor 7 puts out a start signal ST to the sensor-drive circuit 9, so that the sensor-drive circuit 9 puts out to the sensor 4 a clock signal $\phi_c$ produced on the basis of the clock pulse CLK and a signal IC for starting the accumulation of the photoelectric conversion output from each sensor array 4a, 4b. Thus, the sensor 4 accumulates therein outputs corresponding to the distributions of quantity of light of the secondary images O" formed on the light-receiving surfaces of the sensor arrays 4a and 4b, and forms data signals a(i) and b(i) ($i=1-N$). Thereafter, when the accumulated outputs assume a predetermined state, the sensor 4 imparts a signal EI to the sensor-drive circuit 9. Thus, the sensor-drive circuit 9 puts out a signal SH and starts to time-sequentially transfer the data signals a(i) and b(i) formed in accordance with the accumulation information from the sensor 4 to the A/D converter circuit 10 in the order of a(1), a(2), ..., a(N), b(1), b(2), ..., b(N), and also puts out to the processor 7 a signal indicative of the termination of the accumulation. The A/D converter circuit 10 converts the input data signals a(i) and b(i) from analog information into 8-bit digital information $D_0$–$D_7$ in synchronism with the conversion signal AD from the drive circuit 9 and puts them out to the processor 7. The processor 7 stores these digitalized data signals a(i) and b(i) in the RAM in succession and, after all the data signals a(i) and b(i) have been stored in the RAM, the amount of defocus of the photo-taking lens 1 is discriminated by a signal processing method to be described, thereby controlling the display of the display device 11 and also causing the motor 12 to effect the focusing operation of the photo-taking lens 1 in accordance with the discriminated amount of defocus. When this focusing operation by the motor 12 is completed, the processor 7 again puts out a start signal ST and effects the aforedescribed operation repetitively. Accordingly, during the time that the release button (not shown) of the camera is held at its first stroke, the present embodiment repetitively effects the distance measuring operation and the focusing operation for rendering the photo-taking lens 1 into its in-focus state.

Figure 5:
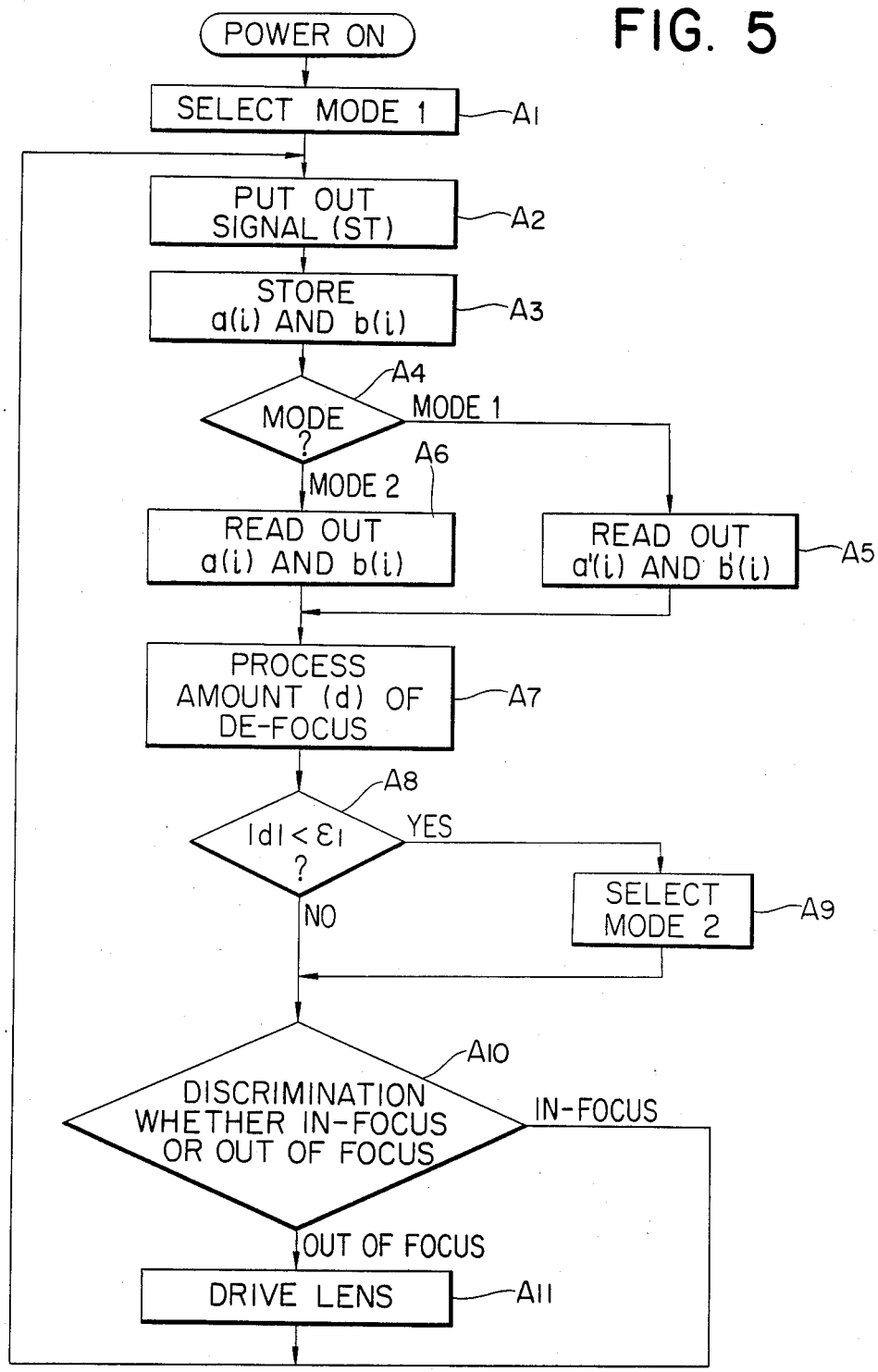
FIG. 5 is a flow chart showing a first signal processing method of the present embodiment.
Figure 6:
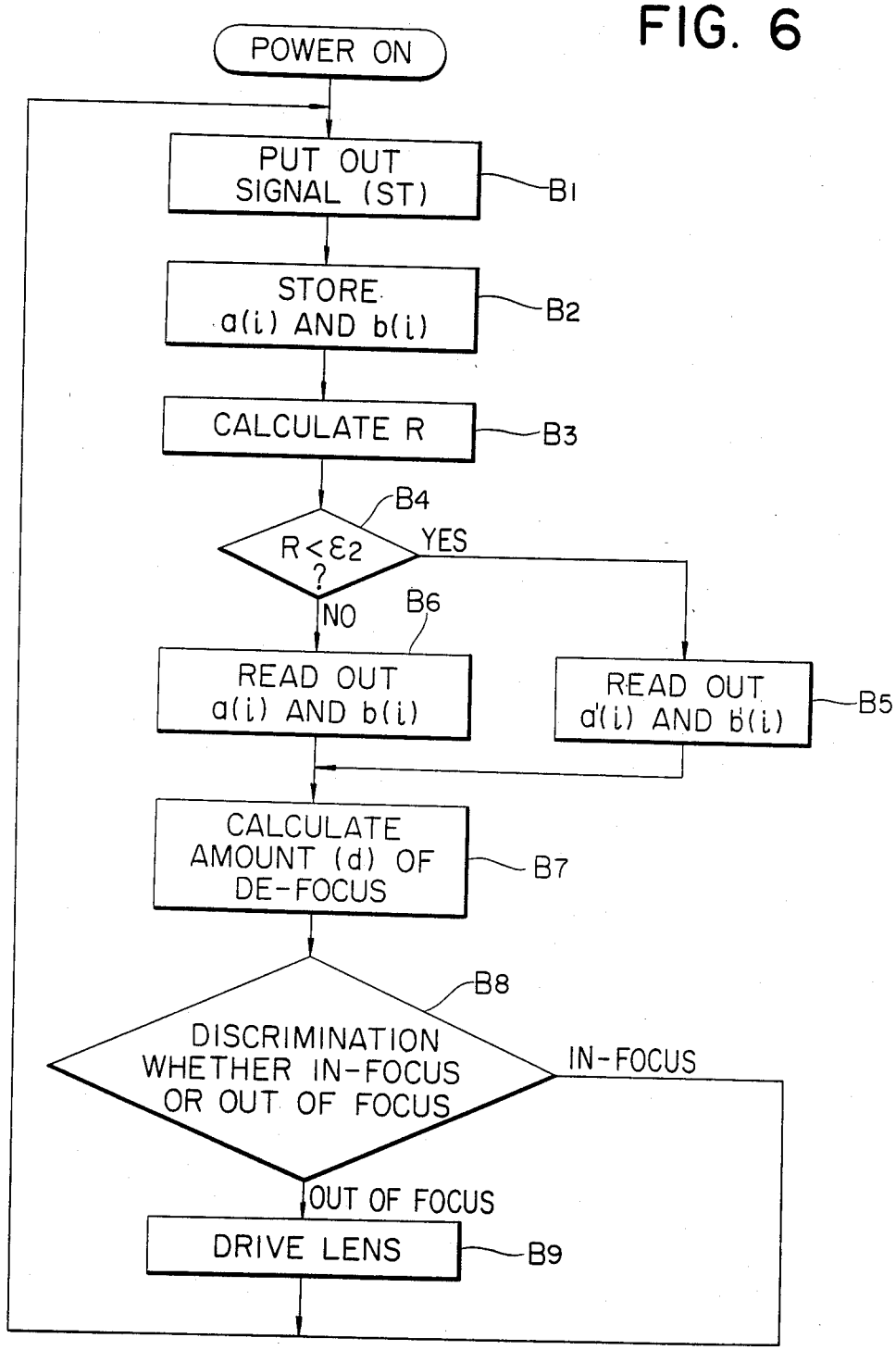
FIG. 6 is a flow chart showing a second signal processing method of the present embodiment.
Figure 7:
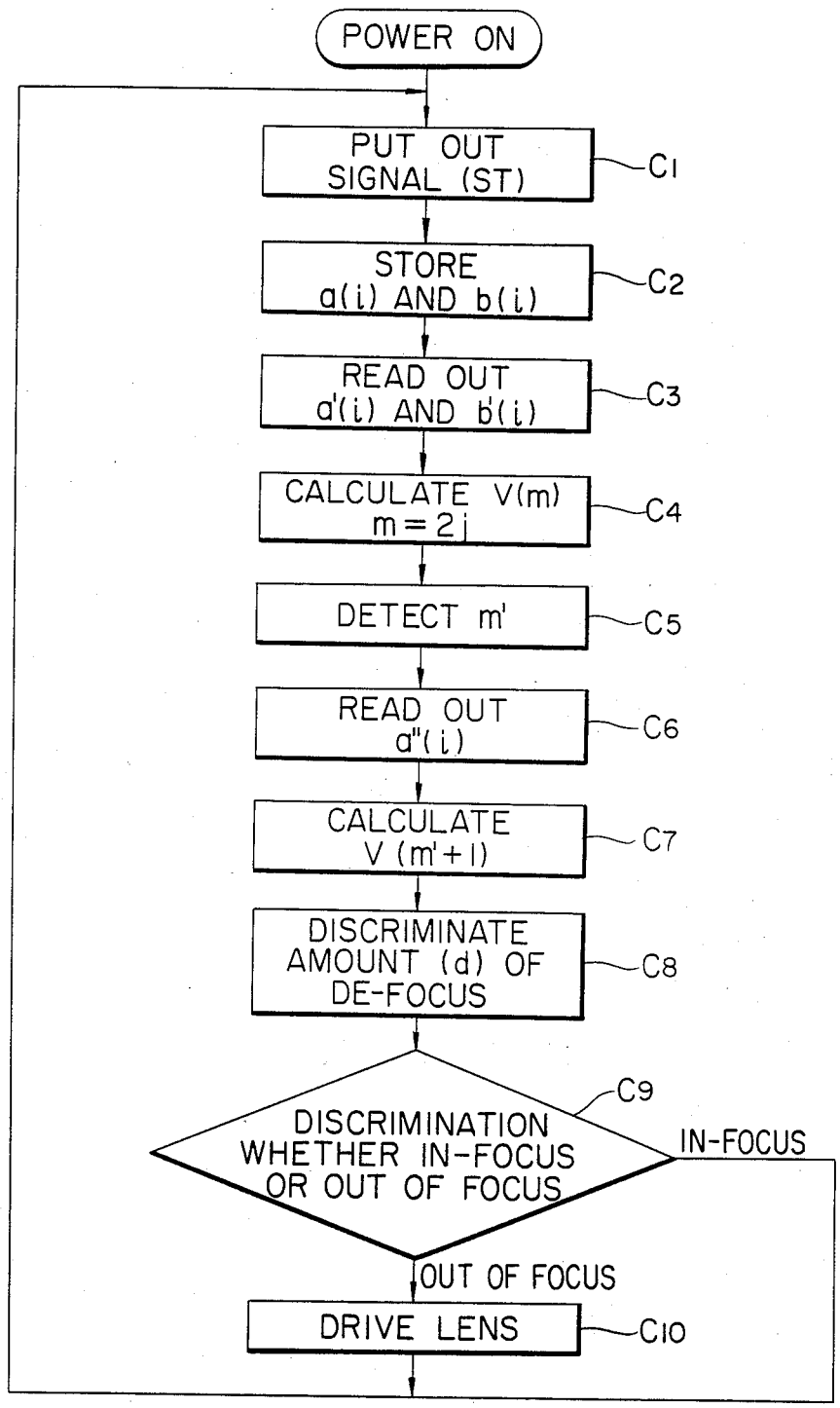
FIG. 7 is a flow chart showing a third signal processing method of the present embodiment.

Signal processing methods in the present embodiment will now be described by reference to the flow charts of FIGS. 5 to 7. In this case, it is to be understood that software for effecting the signal processings based on the flow charts of FIGS. 5 to 7 are pre-programmed in the processor circuit 7.

A first signal processing method shown in FIG. 5 will first be described. This signal processing method is based on the idea that in a condition wherein the amount of defocus is great, high sampling accuracy is unnecessary for the detection of the amount of defocus. That is, considering the focus detecting process, the photo-taking lens 1 is normally not in focus in the initial condition. In such a condition, it takes precedence of precise calculation to calculate the rough value of the amount of axial movement of the lens and urgently move the photo-taking lens 1.

Figure 8A:
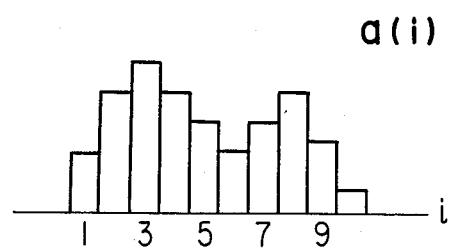
FIGS. 8A, 8B and 8C illustrate the state of each data in the first and second signal processing methods.
Figure 8B:
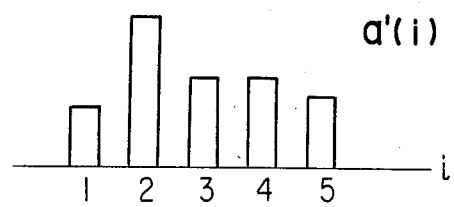
Figure 8C:
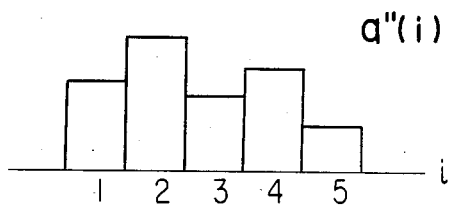

Thus, in this first method, curtailment of the number of the data used for operation as shown in FIGS. 8B and 8C is effected from the original data a(i) and b(i) obtained by the sensor arrays 4a and 4b as shown in FIG. 8A. FIG. 8B shows the original data selected every other data, and FIG. 8C shows the sum or average of the photoelectric outputs of two adjacent elements. Describing this by a mathematical expression, when the original data obtained by the sensor arrays 4a and 4b are a(i) and b(i) (b(i) is not shown), the value obtained from the following equation (6) is used as the data for calculation in the case of FIG. 8B:

$$\left. \begin{array}{l} a'(i) = a(2i - 1) \\ b'(i) = b(2i - 1) \end{array} \right\} \quad (6)$$

where $i=1-N/2$.

In the case of FIG. 8C, the following equation (7) is used:

$$\left. \begin{array}{l} a'(i) = a(2i - 1) + a(2i) \\ b'(i) = b(2i - 1) + b(2i) \end{array} \right\} \quad (7)$$

where $i=1-N/2$.

In equations (6) and (7), it is of course possible to shift the conversion from the original data by 1 bit each and bring about $a'(i)=a(2i)$, $a'(i)=a(2i)+a(2i+1)$, etc. By these operations, the number N of data is reduced by half and thus, in the aforementioned equations (4) and (5), the amount of operation for finding the amount of defocus decreases to approximately ¼.

Now, the following two focus detection sequences are conceivable where the method as described above is adopted for the handling of data. First, the first focus deviation is carried out with the amounts of data $a'(i)$ and $b'(i)$ reduced by half as mentioned above, in accordance with equations (4) and (5), and the photo-taking lens 1 is moved to the vicinity of the in-focus point in accordance with the calculated amount of defocus. Thereafter, the second detection is carried out and the data $a(i)$ and $b(i)$ sampled at this time are operated and processed by equations (4), (5), etc. in such a form that all of these data observed are intactly used. On the basis of the result, the position of the photo-taking lens 1 is finely adjusted, thus completing the focus detection sequence. What has been described above is a sequence which takes into account to lock the focus adjustment after focusing in a conventional still camera and immediately effect photographing. On the other hand, in the case of a video camera or an 8 mm camera, the photographer often seeks after objects which are in motion and therefore, it is difficult uniformly to take up the data for calculation. Also, even in the case of a still camera, there are many such objects and so, it is apparent that it is better to adopt a form in which the way of taking up the data for calculation can be selected by change-over of the mode.

The significances of curtailing the number of sampling data lie in two points, i.e., decreasing the amount of operation and decreasing the necessary memory capacity, and the condition of the embodiment including even hardware differs depending on priority assignment. Considering the matter in a direction in which the amount of operation is simply decreased and importance is attached to high speed, utilization can be made in such a form that, as shown in the embodiment of FIG. 4, the original data $a(i)$ and $b(i)$ are intactly loaded into the RAM of the processor 7 and the amount of data used for calculation is decreased by software as shown in FIGS. 8B or 8C. In this case, a detailed calculation can also be re-made by the use of all the stored data signals $a(i)$ and $b(i)$ during movement of the photo-taking lens 1. Also, usually, the time required for the driving of the photo-taking lens 1 is somewhat longer than the operation time. Accordingly, if the result of a detailed calculation is computed before the driving of the photo-taking lens 1 is terminated, it will also become possible to use this immediately as the control information of high accuracy regarding the moving photo-taking lens 1. That is, according to such a method, the memory capacity is not decreased, but instead, the time required for calculation is effectively reduced to $\frac{1}{4}$ of the time heretofore required and focus detection having an equivalent accuracy becomes possible.

On the other hand, if importance is attached to reducing the memory capacity, the hard embodiment can be constructed such that the RAM of the processor 7 is loaded in such a form that the amount of data is reduced as shown in FIG. 4A or 4B. In such case, the necessary memory capacity is decreased correspondingly to a decrease in the amount of data, but the result of the operation of the amount of defocus is of low accuracy. This influence is particularly remarkable where the object to be photographed is a fine pattern comprising chiefly a high frequency component. In this case, the amount of information itself of the data loaded into the RAM of the processor 7 is already decreased and therefore, the accuracy will not be improved unless data sampling is effected again.

The following sequence is conceivable as an example of the focus detection sequence based on the latter method. The data $a'(i)$ and $b'(i)$ having doubled sampling pitch are used for the first stage of focus detecting operation, the rough value of the amount of defocus is found by equation (4) or (5) and the photo-taking lens 1 is moved on the basis of this information. Subsequently, the original data $a(i)$ and $b(i)$ are intactly used for the second stage of focus detecting operation and operation processing of the amount of defocus is carried out. In this case, the length of the distance measuring view field, i.e., the range of the photoelectric conversion elements used in the sensor arrays 4a and 4b, is shortened in accordance with the memory capacity of the RAM in the processor 7. In a focus detecting apparatus using the deviation of two images, a relatively great length of view field is required because the common area of the two images to be correlated when the amount of deviation is great is decreased. However, when the photo-taking lens is substantially in focus, the deviation between the two images is slight and therefore, correlative operation of equation (4) or (5) is sufficiently possible even for a short length of view field. That is, in the above-described focus detection sequence, a memory of a predetermined capacity is used in the first stage in a direction in which the sampling pitch is made rough and the length of the view field is lengthened, and the memory is used in the second stage in a direction in which the sampling accuracy is enhanced and the length of the view field is shortened. This method is very effective in avoiding the concurrence of the far and the near.

The first signal processing method shown in FIG. 5 corresponds to the former one of the aforedescribed focus detection sequences. That is, according to this first signal processing method, the operation of the processor 7 of FIG. 4 is as follows.

By the closing of the main switch, mode 1 is selected at step A1. A start signal ST is put out at step A2 to effect accumulation of image information in the sensor 4 and transfer of the data signals $a(i)$ and $b(i)$ formed in accordance with the accumulation information. At step A3, the digitalized data signals $a(i)$ and $b(i)$ from the A/D converter circuit 10 are stored. At step A4, mode discrimination is effected and if the mode is mode 1, the program proceeds to step A5 and if the mode is mode 2, the program proceeds to step A6. At step A5, data $a'(i)$ and $b'(i)$ for operation are formed from all data signals $a(i)$ and $b(i)$ stored in the RAM of the processor 7 by the use of equations (6) and (7) and curtailment of the number of data is effected. At step A6, all data signals $a(i)$ and $b(i)$ are read out as the data for operation. At step A7, the operation of finding the amount d of defocus by equations (4) and (5) by the use of the data for the operation formed at step A5 or A6 is carried out. At step A8, whether the absolute value $|d|$ of the found amount d of defocus is smaller than $\epsilon_1$ set to a predetermined level is discriminated and, in the case of YES, the program proceeds to step A9 and, in the case of NO, the program proceeds to step A10. At step A9, mode 2 is selected. At step A10, discrimination of the in-focus is effected from the found amount d of defocus and the display of the display device 11 is controlled on the basis of the result of the discrimination and, if the in-focus is discriminated, the program goes back to step A2 and, if the out-of-focus is discriminated, the program proceeds to step A11. At step A11, the motor 12 is driven to effect the focusing operation of the photo-taking lens 1 corresponding to the amount d of defocus, whereafter the program returns to step A2.

The second signal processing method of FIG. 6 will now be described. This second signal processing method differs from the first signal processing method in that control of the number of data used for operation is effected in accordance with the intensity of the variation in the distributions of quantity of image light on the light-receiving surfaces of the sensor arrays 4a and 4b. That is, in the focus detecting apparatus of FIG. 1, the amount of deviation of the two secondary images O″ becomes smaller as the in-focus is approached while, at the same time, the secondary images O″ become focused with respect to the sensor arrays 4a and 4b and therefore, the distributions of quantity of image light exhibit an intense variation and the difference between the outputs of two adjacent ones of the photoelectric conversion elements constituting the sensor arrays 4a and 4b becomes greater. Accordingly, to discriminate this, the second signal processing method is designed to calculate $$R = \sum_{i=1}^{N-1} |a(i) - a(i+1)| \quad (8)$$

or $$R = \max \{|a(1) - a(2)|, \quad (9)$$
$$|a(2) - a(3)|, \ldots |a(N-1) - a(N-1)|\}$$

and control the number of data used to find the amount of defocus, by this R. The operation of the processor 7 based on the second signal processing method is as follows. In this method, steps B1, B2, B5, B6, B7, B8 and B9 are the same as the steps A2, A3, A5, A6, A7, A10 and A11, respectively, in the first signal processing method of FIG. 5 and therefore need not be described. At step B2, the inputting and storage of data signals a(i) and b(i) is terminated, whereafter the processor 7 calculates R by the use of equations (8), (9), etc. at step B3. Thereafter, at step B4, whether R is smaller than a value $\epsilon_2$ set to a predetermined value is discriminated and in the case of YES, the program proceeds to step B5, at which a′(i) and b′(i) are calculated from equations (6), (7), etc. and curtailment of the number of data is effected. In the case of NO, the program proceeds to step B6, at which all data a(i) and b(i) are made into data for operation.

The photoelectric conversion output is put out as a time-sequential signal in the order of a(1), a(2), ..., a(N), b(1), b(2), ..., b(N) and therefore, in the second signal processing method, when a(N) is loaded into the memory, judgment regarding how to handle the data may be made by the use of equation (8) or (9), the data a(1)−a(N) may be cancelled, operated and re-arranged in the memory, and the data b(1)−b(N) may be loaded into a resulting memory space, thereby effecting the operation of the amount of defocus. That is, if some dummy photoelectric conversion elements are provided between a(N) and b(1), intelligent processing matching the nature of the distribution of quantity of image light will be possible even by a small memory capacity in this manner. In the second signal processing method, uniform processing is not carried out even in the vicinity of in-focus, but high-speed operation is effected at rough sampling for objects having a gentle variation in distribution of quantity of image light and operation of high accuracy is effected for objects of acute structure.

The third signal processing method of FIG. 7 will now be described. In the previously described first and second signal processing methods, two causes for reduced accuracy are conceivable when the amount of data is decreased. A first cause is that the sampling density of the information of the distribution of quantity of image light is low and therefore the high frequency component of the image is not reflected in the result of the operation. However, in the initial focus detecting operation, in most cases, the photo-taking lens 1 is greatly defocused and therefore, often, the high frequency component is not included in the distribution of quantity of image light and this does not offer a serious problem. A second cause for reduced accuracy is that the unit when one image is moved relative to the other image during the operation of the image deviation is enlarged to correspond to two pitches of the photoelectric conversion elements in the sensor arrays 4a and 4b.

The third signal processing method takes this point into account and the principle thereof will first be described roughly.

Figure 9A:
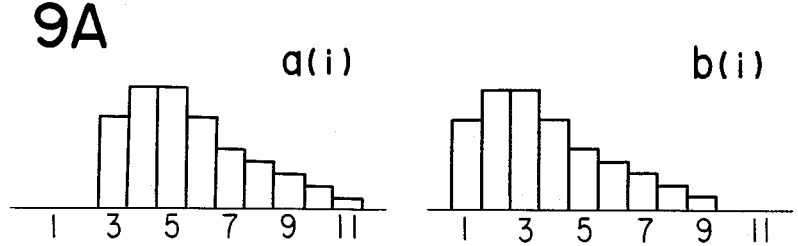
FIGS. 9A, 9B and 9C illustrate the state of each data in the third signal processing method.
Figure 9B:
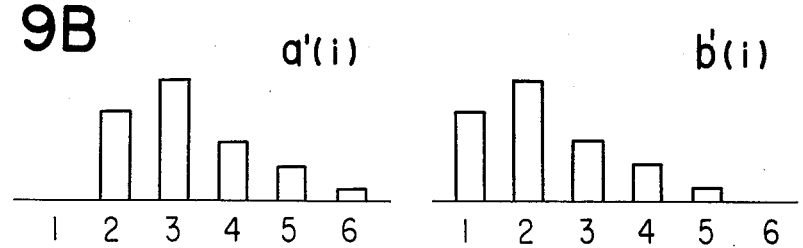
Figure 9C:
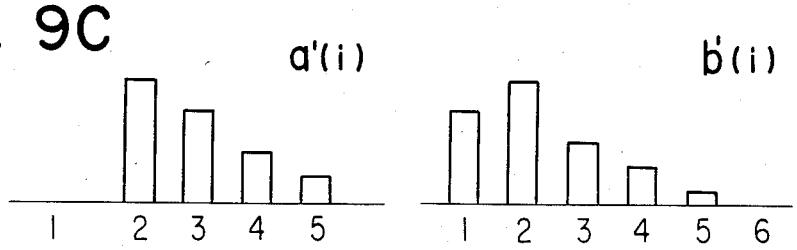

FIG. 9A shows the original data a(i) and b(i) of the two secondary images I″ by the sensor arrays 4a and 4b, and FIG. 9B shows the operation data a′(i) and b′(i) selected every other data in accordance with the aforementioned equation (6). In the third signal processing method, the amount of image deviation is first calculated by the use of a′(i) and b′(i). Then, as a second stage, the selection of a′(i) is shifted by 1 bit and a″(i) is found in accordance with $$a''(i) = a(2i) \quad (8)$$

where $i = 1 - N/2$,
and the operation of the image deviation is again effect. FIG. 9C shows the data for this operation.

Figure 10:
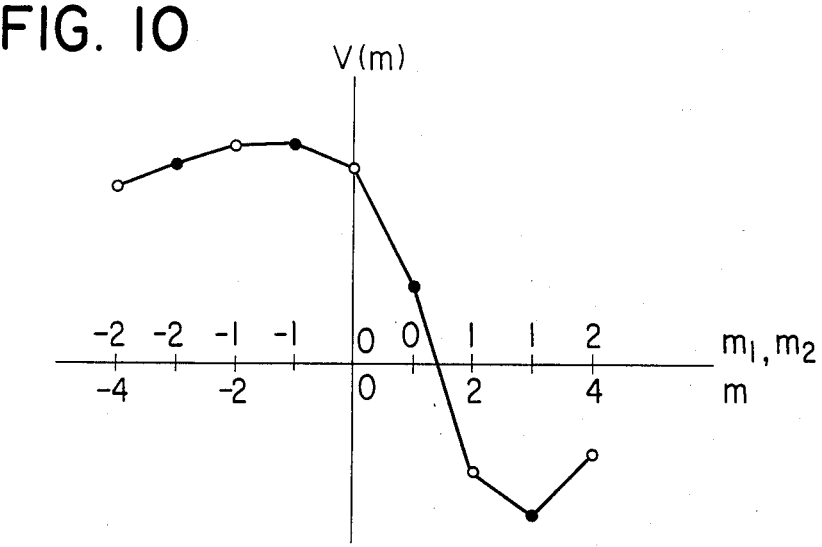
FIG. 10 shows an example of the operation output when the third signal processing method is used.

FIG. 10 shows a graph in which V(m) is plotted relative to m when equation (4) is used as an example of the method of operation the amount of deviation of the two images. The results obtained by using the a′(i) of equation (6) are indicated by white circle ○, and the results obtained by using the a″(i) of equation (8) are indicated by black circle ●. The relation between the amounts of displacement $m_1$ and $m_2$ used in each operation and the actual amount of displacement m is defined as $m_1 = m/2$ and $m_2 = m/2 + 1$ when m is an even number. The change of the way of taking the data from a(i) from equation (6) to equation (8) corresponds to the movement of the image represented by a(i) by one pitch of the sensor array 4a and therefore, white circles and black circles appear alternately. In this manner, the unit of image shift can be made substantially equivalent to the pitch of the photoelectric conversion elements in the sensor arrays and the accuracy of calculation of the amount of defocus can be enhanced.

Also, where the amount of image deviation V(m) is calculated by the use of the a″(i) of equation (8) at the second stage, the rough estimated value of the amount of image deviation V(m) is given by the calculation at the first stage using the a′(i) of equation (6) and therefore, the range of m need not assume the total area, but in the case of FIG. 10, m=1, i.e., one point, suffices. That is, the amount of operation required for the calculation of the image deviation at the second stage is negligible as compared with the total amount of operation, and the operation is completed within a time as short as ¼ of the time required in the conventional technique.

The operation of the processor 7 based on the third signal processing method is as follows. In FIG. 7, steps C1, C2, C3, C9 and C10 are the same as the steps A2, A3, A5, A10 and A11, respectively, in the first signal processing method of FIG. 5 and therefore need not be described. At step C4, equation (4) is calculated by the use of data a'(i) and b'(i) formed by equation (6) at step C3. In this case, however, m is an even number. Subsequently, at step C5, the value m' of m which satisfies V(m)>0, V(m+2)<0 or V(m)<0, V(m+2)>0 with respect to each V(m) is found. At step C6, a''(i) is found by the use of equation (8). At step C7, V(m'+1) based on equation (4) is calculated by the use of b'(i) found at step C3 and a''(i) found at step C6. At step C8, the amount d of defocus is discriminated on the basis of the result of the operation effected at steps C4 and C8, and then the program proceeds in the in-focus discrimination of step C9.

In the foregoing description, the data extraction in the form shown in FIG. 8B has been the standard, but it is of course possible to use a similar calculation procedure even if the data are combined in the form of FIG. 8C. Also, in the above-described embodiment, the amount of deviation of two images is operated with the actually effective pitch of the sensor arrays 4a and 4b being doubled, but the magnification of the actually effective pitch may also be other magnification. Description will further be made of a case where the actually effective pitch is tripled.

Figure 11A:
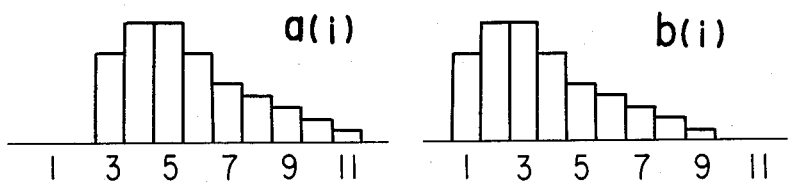
FIGS. 11A, 11B, 11C and 11D illustrate other state of each data in the third signal processing method.

FIG. 11A shows the original data a(i) and b(i) of the photoelectric conversion output, and the data for operation process are extracted from these a(i) and b(i) by $$\left.\begin{array}{l} a'(i)_1 = a(3i - 2) \\ a'(i)_2 = a(3i - 1) \\ a'(i)_3 = a(3i) \end{array}\right\} \quad (9)$$

$$b'(i) = b(3i) \quad (10)$$

Figure 11B:
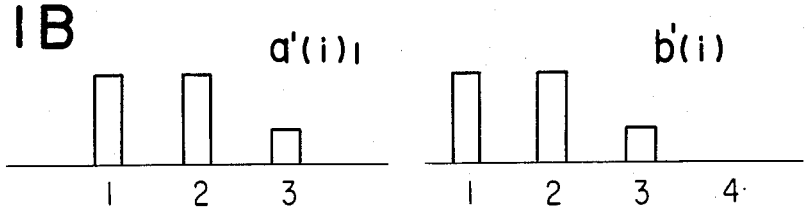
Figure 11C:
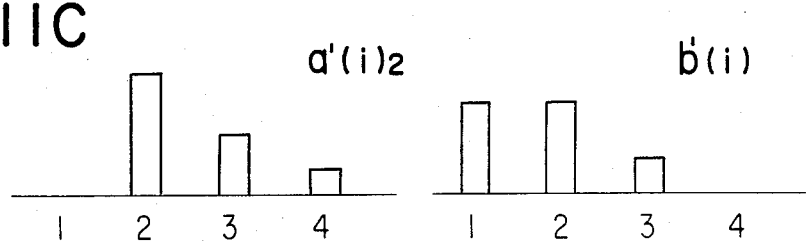
Figure 11D:

As a first stage, a'(i)$_1$ and b'(i) shown in FIG. 11B are combined to calculate the amount of image deviation. The amount of operation required therefor is 1/9 of that in a case where all of the value of the photoelectric conversion output is used, because the number of data is decreased to ⅓. Subsequently, as a second stage, a'(i)$_2$ and b'(i) shown in FIG. 11C are combined and, as a third stage, a'(i)$_3$ and b'(i) shown in FIG. 11D are combined, thereby operating the amount of image deviation and thus, as previously described, detection of the amount of defocus can be accomplished at the same pitch accuracy as the pitch of the photoelectric conversion elements in the sensor arrays 4a and 4b. The total operation time including the first stage, the second stage and the third stage is ⅓ of that in a case where all of the values a(i) and b(i) of the photoelectric conversion outputs are used.

Also, it is of course possible to combine three kinds of data a'(i) even in a method of taking the sum of the photoelectric outputs of adjacent elements as indicated by equation (7). According to this method of taking the sum, such a combination of operation data that the actually effective sensor pitch is a fraction times as great as the original pitch, is also possible as shown by:

$$\left.\begin{array}{l} a'(1) = a(1) + (½) \cdot a(2) \\ a'(2) = (½) \cdot a(2) + a(3) \\ a'(3) = a(4) + (½) \cdot a(5) \end{array}\right\} \quad (11)$$

When the data signals a(i) and b(i) are curtailed and the picture element pitch of the sensor arrays 4a and 4b is effectively increased, the error resulting from the pitch of the image deviation being rough is eliminated by the third signal processing method. However, where the object to be photographed is a pattern comprising chiefly a high frequency component, it remains as an error factor that the actually effective picture element pitch is rough. To eliminate this, a sequence of returning to the normal calculation process when the photo-taking lens 1 has been adjusted to the vicinity of the in-focus can be set as in the first and second signal processing methods.

According to the present invention, as described above in detail, the amount of operation for finding the amount of defocus can be reduced without reducing the accuracy of the focus detecting performance, and this leads to the provision of a focus detecting apparatus having a high process speed and high accuracy of detection.

In the first and second signal processing methods, equation (11) may of course be adopted to increase the sampling pitch of the image actually effectively to fractional times, say, 1.5 times.

What I claim is:

1. A focus detecting apparatus including:
   (a) optical means;
   (b) sensing means for sensing radiation distribution for forming an image formed by said optical means, said radiation distribution being formed from two image rays separated through different exit pupils of said optical means, and said sensing means comprising a first photosensitive array which forms electric signals corresponding to a radiation distribution formed by one of said image rays, and a second photo-sensitive array which forms electric signals corresponding to a radiation distribution formed by the other image ray; and
   (c) discriminating means for effecting a detection operation of the focus state of said optical means, said discriminating means having:
      (i) a first mode in which said discriminating means selects a smaller number of signals than the number of elements forming said first and second arrays, to detect the focus state on the basis of the selected signals from each array when the amount of defocus is over a predetermined value, said selected signals being output from elements from each of said first and second arrays; and
      (ii) a second mode in which said discriminating means detects the focus state on the basis of the signals output from all the elements in said first and second arrays.

2. An apparatus according to claim 1, wherein said discriminating means has selecting means for selecting, in said first mode, only output signals from every other element in each of said first and second arrays.

3. An apparatus according to claim 1, wherein said discriminating means has selecting and calculating means for successively selecting a pair of adjacent elements in said first and second arrays and summing up the signals from the selected pairs to form said selected signals from each array in said first mode.

4. An apparatus according to claim 1, wherein said discriminating means has selecting and calculating means for successively selecting a pair of adjacent elements in said first and second arrays and averaging the signals from the selected pairs to form said selected signals from each array in said first mode.

5. A focus detecting apparatus comprising:
(a) optical means;
(b) sensing means for sensing a radiation distribution for forming an image formed by said optical means, said radiation distribution being formed from two image rays separated through different exit pupils of said optical means, and said sensing means comprising a first photosensitive array which forms electric signals corresponding to a radiation distribution formed by one of said image rays, and a second photo-sensitive array which forms electric signals corresponding to a radiation distribution formed by the other image ray;
(c) sample and output means for successively sampling signals output from each pair of photosensitive elements, wherein a predetermined operation is applied to the sampled signals from said first array to output third signals and wherein a predetermined operation is applied to the sampled signals from said second array to output fourth signals, when said optical means is in a defocus state; and
(d) means for detecting the focus state of said optical means, said detecting means detecting the correlation of image signals corresponding to the amount of defocus of said optical means on the basis of said third and fourth signals.

6. A focus detecting apparatus according to claim 5, wherein said sample and output means effects a summing operation of the outputs from each pair of said sensing elements which exist adjacent each other and each of the sums is used to effect autofocus operation.

7. A focus detecting apparatus according to claim 5, wherein said sample and output means calculates the average of outputs from each pair of said sensing elements which exist adjacent each other, and each average is used to effect autofocus operation.

8. A focus detecting apparatus according to claim 5, wherein said sample and output means selectively effects said operation by using all of the signals from each of said sensing means.

9. A focus detection apparatus including:
(a) optical means;
(b) a pair of sensing means each comprising an array of photo-sensitive elements, said two sensing means respectively receiving first and second radiation patterns of a detection scene formed by said optical means to form first data signals and second data signals respectively corresponding to said first and second radiation patterns; and
(c) discriminating means for effecting a detection operation of the focus state of said optical means on the basis of at least some of said first data signals and at least some of said second data signals, said discriminating means having a first mode in which said discriminating means selects some signals from each one of said first data signals and second data signals, said some signals being in a specific region of said radiation patterns and being output signals from a series of adjacent photo-sensitive elements, and a second mode in which said discriminating means selects some signals dispersedly existing over each one of said first and second radiation patterns, or some signals each of which is formed by calculating each pair of signals over each one of said first and second radiation patterns.

10. A focus detection apparatus according to claim 9, wherein the signals selected in said first mode are signals corresponding to the center area of said first and second radiation patterns.

* * * * *